Oct. 9, 1956

R. F. WOODWARD 2,766,317

DEVICES FOR ANCHORING CORDS

Filed June 15, 1951

INVENTOR
R. F. WOODWARD
BY [signature]
ATTORNEY

United States Patent Office 2,766,317

Patented Oct. 9, 1956

2,766,317

DEVICES FOR ANCHORING CORDS

Richard F. Woodward, Anneslie, Md., assignor to Western Electric Company, Incorporated, New York, N. Y., a corporation of New York Application June 15, 1951, Serial No. 231,882

3 Claims. (Cl. 174—135)

This invention relates to devices for anchoring cords, and more particularly to devices for gripping and anchoring communications cords.

In connecting a conductive cord to a terminal post in a service location in which the cord may be subjected to abusive pulling actions, it is imperative to provide an anchor for the cord in addition to the electrical connections made between the terminal and conductive wires which may make up the cord. Such an anchor serves to withstand strains on the cord which would otherwise break the electrical connections between the terminal and the conductive wires of the cord. For example, in a modern deskset telephone in which a handset may rest upon a cradle of a base, the handset may be electrically connected to the base by a plurality of conductive wires included within a jacketed, retractile, instrument cord, and the opposite ends of the jacketed instrument cord may also be anchored to the handset and to the base. This anchorage arrangement secures the electrical connections against destructive strain which may occur in using the telephone, should an attempt be made to carry the handset further away from the base than the normal distance which the retractile instrument cord will permit. In addition, a flexible connecting cord which extends from the telephone base to a terminal block connected to an outside communications line, should also be anchored to the base. Heretofore such anchors have essentially comprised hooks integral with or attached to simple metallic bands encircling the cords, and these bands have not been provided with adequate means for positively gripping the cords.

An object of the invention is to provide new and improved devices for anchoring cords.

A further object of the invention is to provide new and improved devices for gripping and anchoring communications cords.

A device illustrating certain features of the invention may include a band designed to encircle a cord, means secured to the band for gripping an encircled cord when the cord is longitudinally tensioned in one direction, and means for anchoring the band against movement in said direction.

A complete understanding of the invention may be obtained from the following detailed description of devices forming specific embodiments thereof, when read in conjunction with the appended drawing, in which.

Figure 1:
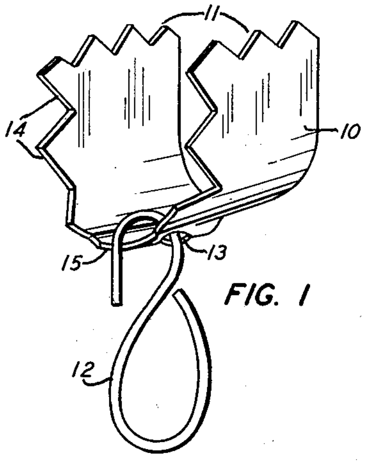
Fig. 1 is a perspective view of a device illustrating certain features of the invention.

Referring now in detail to the drawing, a band 10 may be formed by punching a U-shaped section (Fig. 1) from a continuous sheet metal strip of a metal, such as aluminum, brass or zinc-coated steel. The band 10 is provided with matching, longitudinal, serrated edges 11—11 designed to mesh into interlocking relationship when the band is crimped about a conductive cord into the tubular form shown in Fig. 2. When the band 10 and a cord gripped by it are installed in a handset or a base of a telephone instrument, the band may be anchored to such instrument by means of an S-shaped hook 12. One end of the hook 12 is passed through an aperture 13 located at one end of the band 10, and the other end of the hook 12 may be secured to an anchor post on the telephone instrument (not shown).

The end of the band 10 on which the hook 12 is located is provided with a plurality of angular projections 14—14, which point longitudinally of the band in a direction opposing the normal pulling force which may be applied to the cord while using the telephone instrument. However, the portion of the end of the band 10 which is immediately adjacent to the hook 12 need not be provided with such projections; instead, a transversely flattened portion 15 may be provided as a bearing surface for the end of the hook 12. The angular projections 14—14 constitute a serrated periphery on this end of the band 10, which may dig into the surface of a cord when a longitudinal force is applied thereto, in a direction opposing said projections, thereby providing a positive gripping action.

Figure 3:
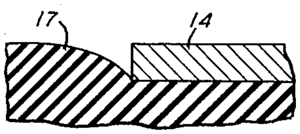
Fig. 3 is a fragmentary sectional view taken along line 3—3 of Fig. 2.
Figure 6:
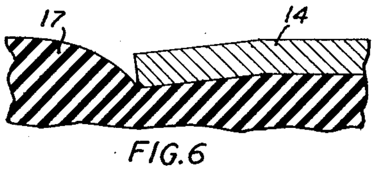
Fig. 6 is a view similar to Fig. 3 showing another modification of the invention.
Figure 2:
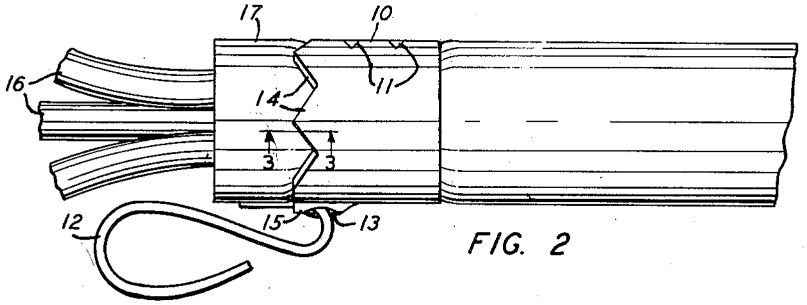
Fig. 2 is a plan view of the device illustrated in Fig. 1, shown in position encircling a portion of a cord.

In Fig. 2 there is shown a portion of a typical cord gripped and anchored by a device embodying the invention. Such a cord includes a plurality of conductors 16—16 and an insulating jacket 17, which jacket may be composed of a plastic material, such as neoprene (polymerized chloroprene), polyvinyl chloride, natural rubber, or the like. The projections 14—14 on the band 10 may be bent inwardly slightly, as is illustrated in Fig. 6, in order to assure a positive gripping of the cord when an opposing longitudinal tension is applied thereto. When the band is crimped about such a cord, the jacket 17 of the gripped cord will be radially compressed in the manner depicted in Fig. 3.

Figure 4:
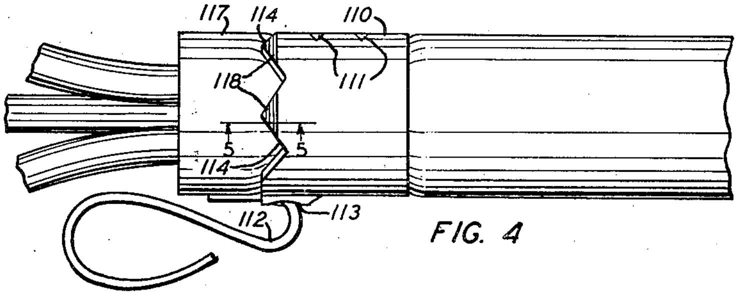
Fig. 4 is a plan view of a portion of a cord encircled by a second embodiment of the device.
Figure 5:
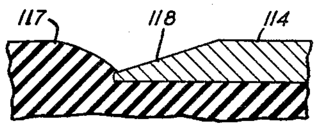
Fig. 5 is a fragmentary sectional view taken along line 5—5 of Fig. 4.

Instead of bending the longitudinal projections 14—14 inwardly as shown in Fig. 6, the device may be modified by forming these projections as longitudinal wedges. Such an embodiment of the invention is illustrated in Figs. 4 and 5, wherein a cord band 110 is provided with matching, longitudinal, serrated edges 111—111, an S-hook 112 extending through an aperture 113, and a plurality of angular projections 114—114. A compressed cord jacket 117 is engaged by longitudinally tapered tip portions 118—118 of the projections 114—114. When an engaged cord is tensioned against the anchoring action of the S-hook 112, the tapered tip portions 118—118 of the projections 114—114 will grip the insulating jacket 117 of the cord with a wedging action, as is illustrated in Fig. 5.

An important advantage of the present invention resides in the fact that a cord may be effectively gripped and anchored when the individual conductors thereof are arranged in parallel relationship, as well as when the conductors thereof are twisted. In the case of a cord having parallel conductors, when a cord band is merely keyed to the cord jacket, there is a possibility that the jacket might slip along the conductors when anchoring tension is applied to the cord. The serrated periphery provided on the end of a cord band embodying the present invention creates a wedging action and radial pressure circumferentially of a gripped cord, whereby cords of various constructions may be positively anchored.

Moreover, such cord bands are inexpensive, easy to manufacture, and simple to apply.

What is claimed is:

1. In a conductive cord having an insulating jacket carrying an encircling, longitudinally split, tubular, metallic band for gripping and anchoring one end of the cord, the improvement which comprises a band having interlocked serrated edges along the longitudinal split, a plurality of angular projections forming a serrated periphery on one end of the band facing a direction opposing the normal direction of longitudinal tensioning of the cord; and an anchoring hook secured to the same end of the band that has the projections, so that the serrated periphery will grip the jacket to anchor the cord when it is tensioned in said normal direction.

2. A device for anchoring jacketed communications cords, which comprises a metallic band for encircling a cord, said band having matching serrated edges on opposite sides thereof designed to meet longitudinally and mesh in interlocking engagement when a cord is encircled, one end of said band having a plurality of inwardly bent angular projections forming a serrated periphery on that end of the band for circumferentially gripping the jacket of an encircled cord under radial pressure when the cord is longitudinally tensioned in a direction opposing the projections, and an S-shaped hook secured to the same end of the band that has the projections for anchoring the band against movement in a direction opposing said projections.

3. A device for anchoring jacketed communications cords, which comprises a metallic band for encircling a cord, said band having matching serrated edges on opposite sides thereof designed to meet longitudinally and mesh in interlocking engagement when a cord is encircled, one end of said band having a plurality of angular projections forming a serrated periphery on that end of the band for circumferentially gripping the jacket of an encircled cord under radial pressure when the cord is longitudinally tensioned in a direction opposing the projections, said projections having longitudinally tapered tip portions for gripping the jacket with a wedging action, and an S-shaped hook secured to the same end of the band that has the projections for anchoring the band against movement in a direction opposing said projections.

References Cited in the file of this patent

UNITED STATES PATENTS

| | | |
|---|---|---|
| 1,713,526 | Frederickson | May 21, 1929 |
| 1,867,065 | Eastman | July 12, 1932 |
| 2,216,157 | Charmoy | Oct. 1, 1940 |
| 2,225,031 | Caldwell | Dec. 17, 1940 |
| 2,290,787 | Walker | July 21, 1942 |
| 2,468,169 | Carlson et al. | Apr. 26, 1949 |
| 2,476,738 | Klumpp | July 19, 1949 |
| 2,609,417 | Cox et al. | Sept. 2, 1952 |

FOREIGN PATENTS

| | | |
|---|---|---|
| 447,987 | Great Britain | May 29, 1936 |